Aug. 17, 1965   M. DWORSKI   3,200,530
FISHING APPARATUS
Filed May 18, 1964
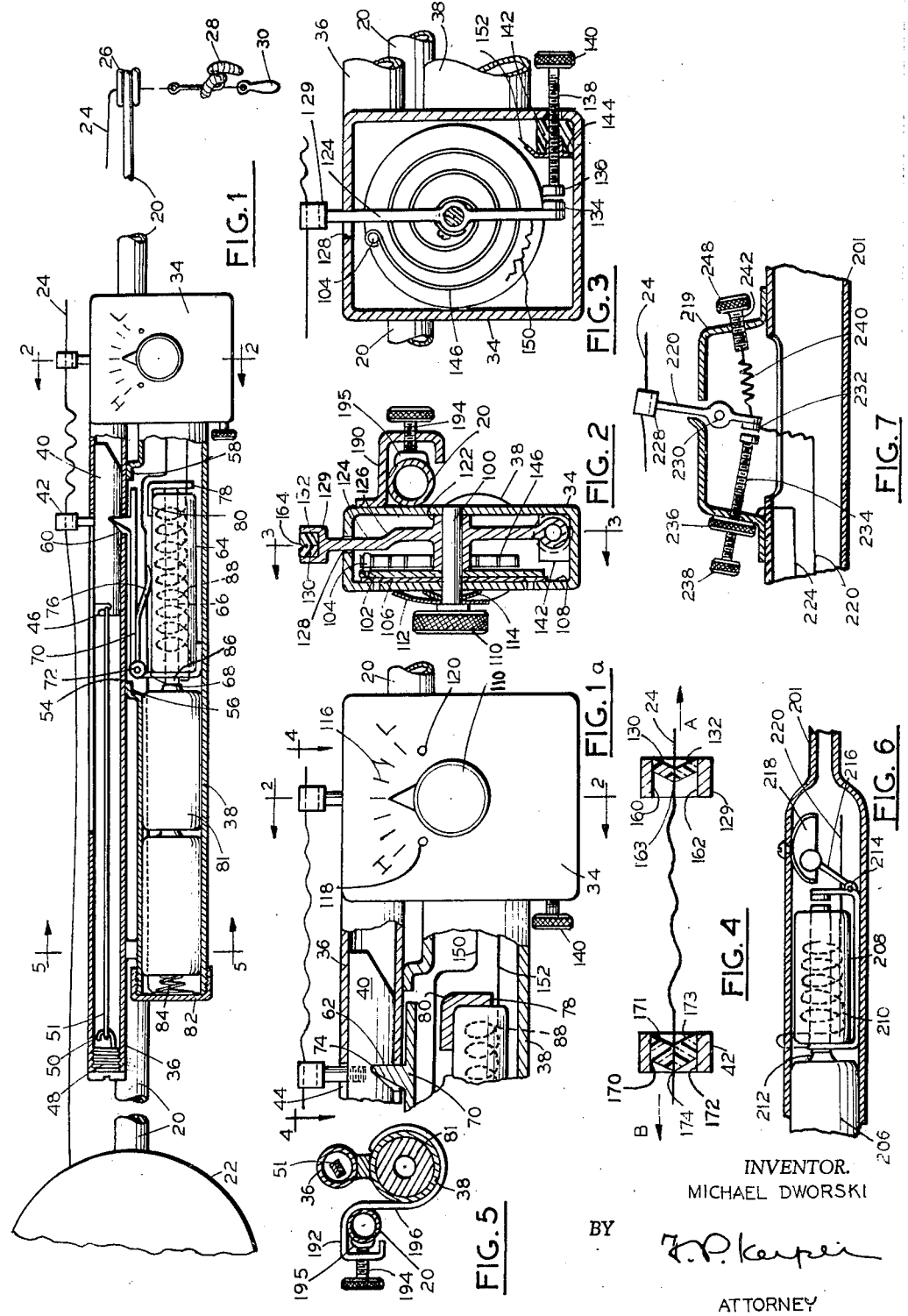
INVENTOR.
MICHAEL DWORSKI
BY
*F. P. Keeper*
ATTORNEY

United States Patent Office 3,200,530
Patented Aug. 17, 1965

3,200,530
FISHING APPARATUS
Michael Dworski, 411 Main St. E., Rochester, N.Y.
Filed May 18, 1964, Ser. No. 368,128
6 Claims. (Cl. 43—16)

This invention relates to fishing apparatus, adapted for application to fishing poles employed for still fishing.

In still fishing, with a fish pole equipped with the usual reel, line, sinker and lure or baited hook, it is customary for the angler to await the occasion of the feel of a strike or nibble, and thereafter exercise skill in sinking the hook into the catch, as by a quick lifting of the tip end of the fish rod. This practice involves a momentary delay between the time the angler first senses the attack of a fish upon the baited hook or lure, and the angler's reflex thereto resulting in quickly lifting the fish rod end to give the line a jerk. In this brief instant many fish avoid getting caught, and get away.

The present invention is directed to apparatus for application to a fish pole capable of sensing the strike or nibble at the lure, and in response thereto providing an instant powerful retraction of the line, without the necessity of any movement of the fish pole. In such manner the nibble or strike is converted to a catch before the fish can sense danger, and avoid being caught.

More particularly the invention is directed to electrical apparatus sensitive to a predetermined change in tension on the fish line, which results in an instant trigger release of a line retracting device. The apparatus comprises a frictional line grip and electrical contacting device adapted to close a circuit upon a predetermined increase in tension in the fish line such as results from a nibble or strike. In one form of the invention such switch or contacting device is adapted to ring a bell, to signal the angler to manually retract the line and thus sink the hook in the catch, and in a preferred form of the invention, the switch closes a circuit to energize a solenoid of a trigger, adapted to release the stored energy of a spring or other resilient means connected to the line, and adapted to provide an instant retraction of the line.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a fragmentary view with parts in section of a fishing rod with the invention applied thereto;

FIGURE 1a is an enlarged view of a part of FIGURE 1;

FIGURE 2 is a sectional view somewhat enlarged, taken on the line 2—2 of FIGURES 1 or 1a;

FIGURE 3 is a fragmentary sectional view taken on the line 3—3 of FIGURE 2;

FIGURE 4 is a fragmentary sectional view of the line grips taken on the line 4—4 of FIGURE 1;

FIGURE 5 is a sectional view taken on the line 5—5 of FIGURE 1;

FIGURE 6 is a fragmentary sectional view of the handle portion of a modified form, and FIGURE 7 is a greatly enlarged fragmentary sectional view of the line triggering contacts applied to a portion of the rod of FIGURE 6.

Referring to the drawings, and particularly FIGURE 1, there is shown a fishing rod 20, with a reel indicated at 22, a line 24 extending through the pole tip eye 26, and extending to the usual lure, or baited hook 28, the line having a sinker 30. Secured to the fishing rod, ahead of the reel 22 is a line tension sensor and retrieving assemblage which may be a unitary structure adapted to be securely clamped to the fishing rod. Such assemblage comprises, a line sensing device, having an electrical contact enclosed in a housing 34, line retrieving apparatus enclosed in a tubular housing 36 extending from one side of the housing 34, and a battery and solenoid actuated latch housing 38 generally tubular in form, and lying alongside of the housing 36, and extending from the side of the housing 34.

Slidably disposed within the tubular housing 36 is a member 40, having an arm 42 extending laterally therefrom through an elongated slot 44 in the housing 36. One end of the member 40 is provided with a hook 46. The end of the tubular housing is closed by a plug 48 threaded into the end, and the plug is provided with a hook 50. The hooks 50 and 46 are adapted to receive the ends of one or more heavy rubber bands 51, which are tensioned to draw the member 40 toward the plug end of the tube.

The tubular housing 38 has an opening in the side wall as at 54 and offsets 56 and 58 may be affixed to the housing 36 as by soldering or other means. The housing 36 is provided with an aperture 60, which registers with a notch 62 in the member 40, when the same is positioned in the end of the tube as shown. Within the housing 38 is a solenoid 64 having a core 66, one end of which is provided with a pole piece 68 extending laterally of the solenoid and to which a latch member 70 is pivoted, as at 72. The latch member or soft iron armature 70 is provided with a latch tooth 74 adapted to engage in the notch 62 of the member 40. The latch member is urged away from the solenoid 64 by a leaf spring 76. The solenoid is provided with a pole piece 78 at its other end of L shape, and the portion 80 thereof is adapted to attract the latch member 70, when the solenoid is energized, to retract the tooth 74 from the notched member to free the same for line retrieving motion within the tubular member 36, under the tension of the elastic rubber bands 51.

Within the housing 38 are one or more flashlight cells 81 disposed in alignment, and the end of the housing 38 is provided with a screw cap 82 having a coil spring contact 84 for contacting the end cell. The cell at the other end is adapted to contact the pole piece 68, which is provided with a conductive member 86, which is connected to one end of the solenoid winding 88.

Within the line tension sensing device is a transverse shaft 100 to which is affixed a friction disk 102 having a hair spring arm 104. The friction disk engages a pad 106 of friction material affixed to the inside wall 108 of the housing 34. The shaft projects through the wall 108, and is provided with a knob 110 and pointer 112, beneath which is a cupped resilient washer 114 for urging the shaft axially to the left, as indicated in FIGURE 2, so as to hold the disk 102 in frictional engagement with the pad 106 and in any position as set by knob 110. Such friction pad may be affixed to the inside wall of the housing by cement, or rivets or other suitable means. Indicia 116 with letters L and H to indicate light and heavy tension may be provided on the exterior of the wall 108, and stop pins 118 and 120 may be provided to engage the pointer 112.

Freely pivoted on the shaft 100 is a sleeve 122 having an arm 124 affixed thereto as by solder or other means. As shown the arm has an offset 126.

One end of the arm projects out through a slot 128 in the housing 34 and is provided with a forked end 129 having inclined rubber line grips 130 and 132. The other end of the arm is provided with a contact 134, adapted to make electrical contact with a second contact 136, on the end of a threaded screw 138 that projects outside of the housing 34. Such screw may have a knurled head 140 for adjustment. The aperture in the side wall of the housing may be large enough to clear the screw, and the screw may be threaded through an insulating block 142 having a contact bushing 144 embedded therein, the block being affixed within the housing by any suitable means.

A hair spring 146 having one end affixed to the arm 104 of the disk, and the other end affixed to the sleeve 122 urges the arm 124 in a clockwise direction as shown in FIGURE 3, or counterclockwise as shown in FIGURE 1. Electrical connections 150 and 152 from the arm 124 and contact screw bushing 144 extend to the solenoid, and the cap or helical spring 84 in the end of the tubular housing 36.

As shown in FIGURE 4, the forked end 129 of the arm 124 is provided with resilient rubber blocks 130 and 132, which are bonded to the inside surfaces 160 and 162 of the forked end 129. The blocks have surfaces which meet and engage one another to form a slit 163, through which the line 24 passes. The blocks may be beveled as at 164 to provide easy entrance of the line into the slit 163. It will be seen that the line 24 when disposed in the slit 163, is frictionally held, when the pull is in the direction of the arrow A. On the other hand the line is freely drawn through the slit when drawn in a direction opposite to arrow A.

The arm 42 of the member 40 is also forked and provided with inclined rubber blocks 171 and 173 bonded to the inside surfaces 170 and 172 thereof, and such blocks meet under tension to form a line receiving slit 174 similar to the slit 163. Such blocks may have a greater resilient grip by being heavier to provide a more secure grip upon the line 24, when the arm the arm pulls the line 24 in the direction of arrow B. Such blocks may be beveled to render it easy to enter the line 24 into the slit in the same fashion as blocks 160 and 162 at 164. The inclination of the blocks is such however as to permit the free drawing of the line therethrough when drawn in the direction of arrow B, as by reeling the line on the reel 22.

The operation of the apparatus will be appreciated from the foregoing description. However, when the line is extended to the extent desired so that the lure is in a spot known for the presence of fish, the line is slipped into the slit 163, and into the slit 174 in the manner indicated with a little slack in the line provided therebetween, as at 180. It will be understood that the member 40 will have been slid to the latched position indicated in FIGURES 1 or 1a, by manually gripping the arm 42 and sliding the member 40 to the latched position. Some slack, as necessary, may be in the line between the slit 174 and reel 22. The contact screw 138 is adjusted to permit the degree of movement to be allowed the arm 124, the amount of movement being increased, when fishing from a boat and particularly, in accordance with the roughness of the water. Also the tension on the spring will be increased from light to heavy when there is rough water, and such adjustments are made to avoid any chance of a false triggering by closure of the contacts 134 and 136 due to wave motion, it being understood that the greatest degree of sensitiveness is the most desirable, if weather conditions and calm water permit. When a nibble upon the line occurs the line is tensioned momentarily thereby to swing the arm 124 and effect closure of the contacts 134 and 136. Instantly the armature or latch tooth 74 is retracted, releasing the member 40, which instantly pulls in about 6 to 12 or more inches of line to complete the catch. The instantaneous action takes place so fast, that the fish is caught. No movement of the fishing rod occurs, which might warn the fish, and the action is quicker than can be effected by the reflexes of the usual angler.

The fish may be reeled in, or the pole swung to bring in the catch, depending on the length of line which is in use. After removal of the catch from the lure, the apparatus is reset and is ready for the next catch. The operation is so fast that the fish has no time to nibble the bait away, and the rebaiting of the hook is seldom necessary.

To detachably apply the apparatus to the usual fish rod, C clamps or other suitable means as at 190 and 192 having thumb screws 194 and pads 195 are provided, one being affixed to one side of the housing 34, and the other on a bracket 196 affixed to the end of the housing 38.

In the modification of FIGURES 6 and 7, the sensor is employed to sound an alarm whereby the angler may immediately snare the fish which has caused the alarm. While not as effective as the previous modification, it permits of a sensitivity to a nibble and a warning thereof, which is greater and quicker than that obtained by a relaxed angler in the normal fishing from the usual fish rod.

As shown, there may be mounted within the handle of a fishing rod, a battery 206, a solenoid 208 having a coil 210, and a magnetic circuit including a bell crank bell ringer 216, pivoted as at 214 to the magnetic circuit. A small bell 218 is provided. The fish pole which is hollow, has mounted thereon a sensor switch housing 219 in which is pivoted in an insulated fashion, an arm having a fish line grip 228, and contact 232. An adjustable tension spring 240 and setscrew 242 with knob 248 is provided to urge the sensor counterclockwise. An adjustable contact screw 234 with knurled head 238 and lock nut 236 is provided. If the fishing rod is metallic, the lead 224 may be grounded thereto and the end of the flashlight cell 206, not shown, may be likewise grounded. A connection from the coil 210 to the contact 232 is indicated at 220. When a nibble occurs, contacts 232 and 234 close and sound the bell 218 which instantly stirs the angler into activity to jerk the line and complete the catch.

While a single modification of the invention with a variation thereof has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Fishing apparatus comprising a tubular member adapted to be attached to a fishing rod, said tubular member having a longitudinal slot therein, a plunger slidable in said tubular member having an arm extending laterally through said slot, resilient tension means disposed in said tubular member and urging said plunger arm towards one end of said slot and tubular member, releasable latch means associated with said plunger for holding said plunger with its arm at the other end of said slot against the tension of said tension means, a fish line grip in the end of said plunger arm, a sensing device disposed adjacent the other end of said tubular member comprising an arm having one end pivoted on the device, on an axis transversely disposed with respect to said plunger arm, said pivoted arm at its other end having a friction grip for the fish line, resilient means for rotating said pivoted arm toward said plunger arm, means for regulating the tension of said last named means, electrical contact means closed by opposite rotation of said pivoted arm, and electro-magnetic means for releasing said latch means in circuit with said contact means for releasing said plunger on contact closing opposite rotation of said pivoted arm.

2. A fishing apparatus in accordance with claim 1, wherein the friction grip of the pivoted arm comprises elastic gripping blocks inclined toward the plunger arm and having yielding line contacting faces for increased frictional grip of a line passing between said faces when the line tends to rotate the pivoted arm against its resilient means.

3. A fishing apparatus in accordance with claim 1, wherein the friction grip of the pivoted arm comprises biasing means for reduced frictional grip of a line frictionally held in said friction grip when the line rotates the arm toward said plunger arm.

4. A fishing apparatus in accordance with claim 1, wherein the friction grip of the pivoted arm comprises biasing means for reduced frictional grip of a line frictionally held in said pivoted arm friction grip when the line moves in a direction to rotate the pivoted arm toward said plunger arm, and in which the plunger arm is provided with a frictional grip for the line, biasing means for said frictional grip for increased grip of a line frictionally held in said plunger arm frictional grip when the line is drawn in the same direction by the plunger arm.

5. Fishing apparatus comprising a tubular member adapted to be attached to a fishing rod, said tubular member having a longitudinal slot therein, a plunger slidable in said tubular member having an arm extending laterally through said slot, resilient tension means disposed in said tubular member and urging said plunger arm towards one end of said slot and tubular member, releasable latch means associated with said plunger for holding said plunger with its arm at the other end of said slot against the tension of said tension means, a fish line grip in the end of said plunger arm, a sensing device disposed adjacent the other end of said tubular member comprising an arm having one end pivoted on the device, on an axis transversely disposed with respect to said plunger arm, said pivoted arm at its other end having a friction grip for the fish line, resilient means for rotating said pivoted arm toward said plunger arm, electrical contact means closed by opposite rotation of said pivoted arm, and electro-magnetic means for releasing said latch means in circuit with said contact means for releasing said plunger on opposite rotation of said pivoted arm.

6. Fishing apparatus comprising a tubular member adapted to be attached to a fishing rod, said tubular member having a longitudinal slot therein, a plunger slidable in said tubular member having an arm extending laterally through said slot, resilient tension means disposed in said tubular member and urging said plunger arm towards one end of said slot and tubular member, releasable latch means associated with said plunger for holding said plunger with its arm at the other end of said slot against the tension of said tension means, a fish line grip in the end of said plunger arm, a sensing device disposed adjacent the other end of said tubular member comprising an arm having one end pivoted on the device, on an axis transversely disposed with respect to said plunger arm, said pivoted arm at its other end having a friction grip for the fish line, resilient means for rotating said pivoted arm toward said plunger arm, electrical contact means closed by opposite rotation of said pivoted arm, and electro-magnetic means for releasing said latch means in circuit with said contact means for releasing said plunger on opposite rotation of said pivoted arm, a fish line having a lure on one end extending through said pivoted arm grip and said plunger arm grip, with limited slack therebetween, said pivoted arm friction grip having biasing means for reduced frictional grip upon drawing said line therethrough by said plunger arm grip.

References Cited by the Examiner

UNITED STATES PATENTS

| | | | |
|---|---|---|---|
| 1,251,221 | 12/17 | Greenwald | 43—25 |
| 2,934,847 | 5/60 | Duff | 43—15 |
| 3,055,135 | 9/62 | Lewis | 43—15 |
| 3,078,609 | 2/63 | Efird | 43—15 |

SAMUEL KOREN, *Primary Examiner.*

ABRAHAM G. STONE, *Examiner.*